Dec. 8, 1936.  C. E. GOETTING  2,063,805
JAR HOLDER
Filed May 4, 1935  2 Sheets-Sheet 2
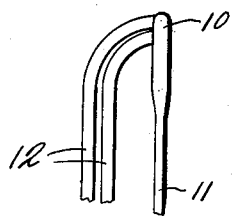
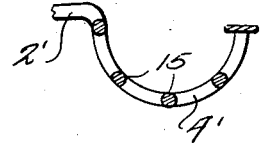
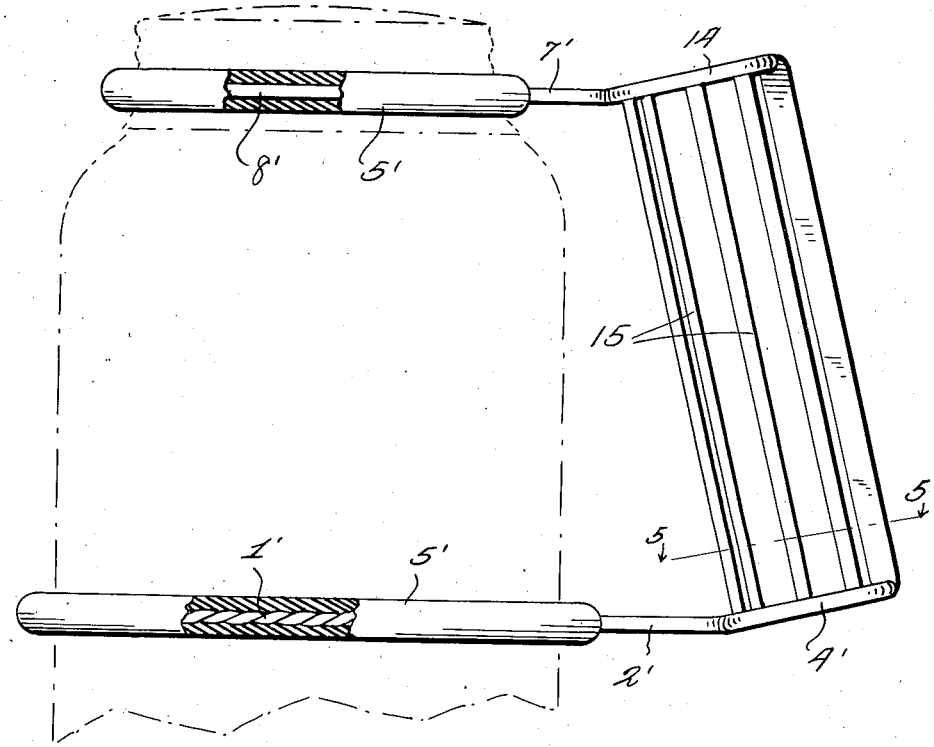
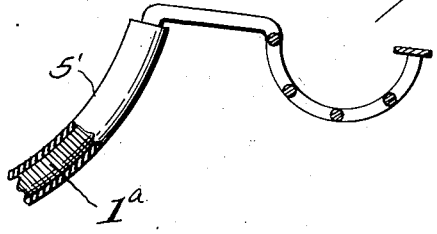
Inventor
C. E. Goetting
By Watson E. Coleman
Attorney Patented Dec. 8, 1936

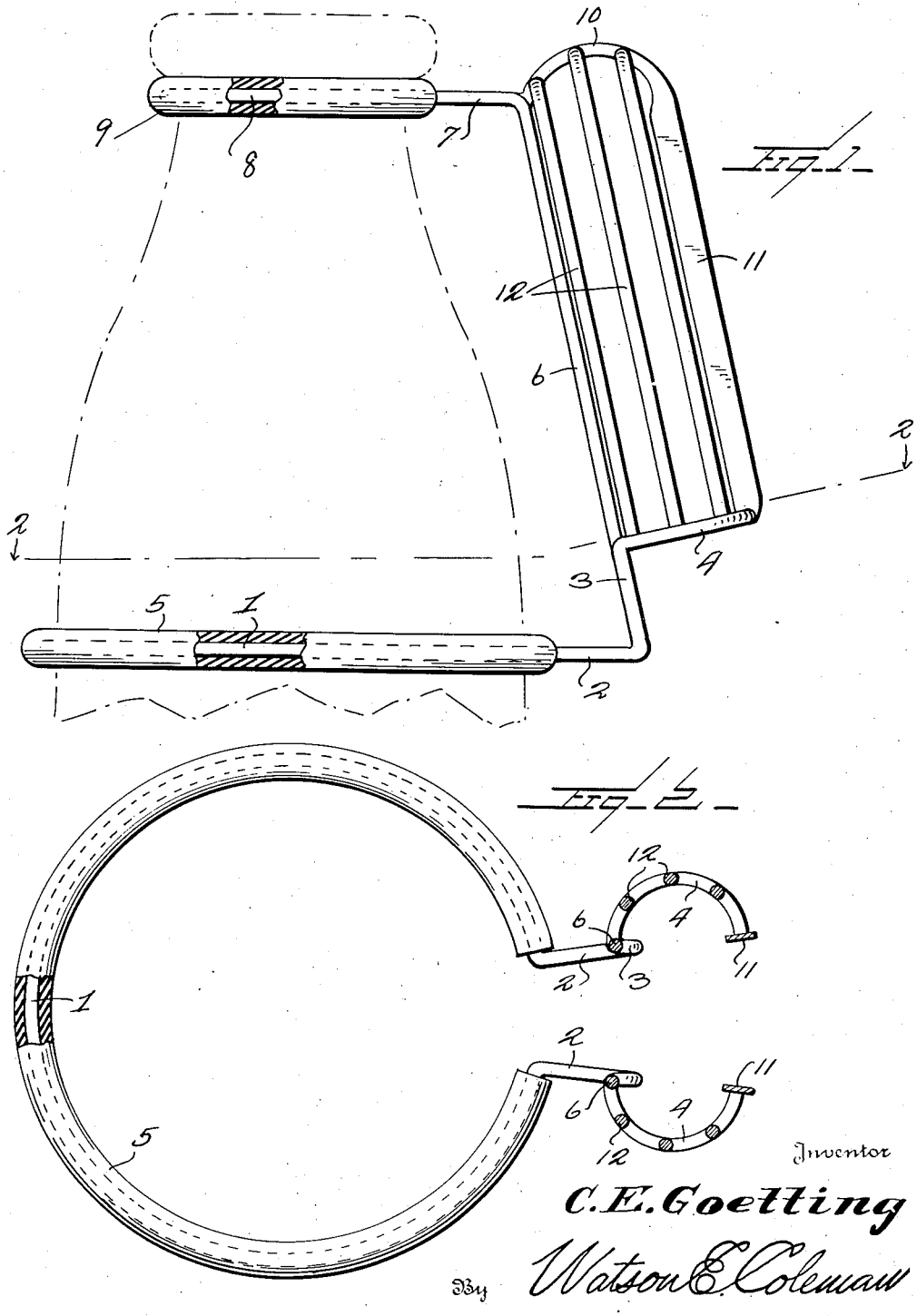

2,063,805

UNITED STATES PATENT OFFICE 2,063,805

JAR HOLDER

Clyde E. Goetting, Drumright, Okla., assignor of one-half to Edward L. Thomas, Drumright, Okla.

Application May 4, 1935, Serial No. 19,900

4 Claims. (Cl. 294—33)

This invention relates to jar holders, and it is primarily an object of the invention to provide a handle and holder of this type which can be readily and conveniently applied to a jar and in a manner to enable the jar to be handled as desired while of a high temperature as for example a result of the material within the jar or the like being hot.

It is also an object of the invention to provide a handle and holder of this kind constructed in a manner whereby the grip of a hand serves to effectively maintain the device in applied or working position.

A further object of the invention is to provide a handle and holder of this kind comprising members to encircle a jar and wherein one of such members is of a flexible type so that the handle and holder can be employed with equal facility in connection with jars or the like of differing cross sectional configurations.

The invention consists in the details of construction and in the combination and arrangement of the several parts of my improved automatic handy handle and holder for jars and the like whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation with portions broken away of a handle and holder constructed in accordance with an embodiment of my invention, an associated container being indicated by broken lines;

Figure 2 is a sectional view taken substantially on the line 2—2 of Figure 1 looking in the direction of the arrow;

Figure 3 is a fragmentary elevational view illustrating the structure at the upper portion of a section of the hand grip;

Figure 4 is a view similar to Figure 1 but illustrating another embodiment of my invention, the same being applied to a container indicated by broken lines of a type different than the form of container indicated in Figure 1;

Figure 5 is a fragmentary detailed sectional view taken substantially on the line 5—5 of Figure 4;

Figure 6 is a fragmentary sectional view illustrating a further embodiment of my invention.

In the embodiment of my invention as illustrated in Figures 1 to 3, I denotes a split loop to substantially surround the lower portion of a jar or kindred container and the extremities of this loop 1 are continued by the relatively short arms 2 substantially coplanar with the loop 1.

The outer ends of these arms 2 extend upwardly a slight distance to provide the supplemental arms 3. The upper end portions of these arms 3 are continued by the outwardly curved arms 4 with their inbow portions oppositely arranged and the arms 4 are coplanar with each other and in a plane above the plane of the loop 1.

To increase the gripping efficiency of the loop 1 the same is preferably encased within a sleeve 5 of rubber compound, such compound being preferably of a character resistant to heat. This rubber compound is preferably of a kind similar to the compounds used in the manufacture of hot water bags.

Welded or otherwise fixedly secured to the junction portions of the arms 3 and 4 are the elongated bars 6, the upper end portions of which being continued by the relatively short arms 7 at right angles thereto and which arms 7 constitute a continuation of the extremities of an upper split loop 8 of a diameter materially less than that of the loop 1. This upper split loop 8 is adapted to surround the neck portion of a jar or kindred container and in order to further facilitate the gripping action of this upper loop 8 the same is also encased within a sleeve 9 preferably of a rubber compound similar in character as the sleeve 5 encasing the loop 1.

To the junction portions of the bars 6 and arms 7 are welded or otherwise fixedly secured the extremities of upwardly curved and rearwardly disposed short arms 10 which are continued by the depending bars 11 having their lower portions welded or otherwise rigidly secured to the outer extremities of the curved arms 4. These bars 11 are flat and of pronounced width so that one will not pass the other when pressure of the hand causes the loops 1 and 8 to contract for proper clamping engagement around a jar. The central portion of each of the upwardly curved arms 10 has welded or otherwise secured thereto the upper curved extremities of the intermediate bars 12 which extend down and are welded or otherwise firmly fastened to the associated curved arm 4 at properly spaced points therealong.

The bars 6, 11 and 12 result in the formation of what might be termed a longitudinally split hand grasp, the sections of which are normally spaced apart whereby the loops 1 and 8 may be manually applied to a jar or kindred container with facility with the upper loop 8 surrounding the neck portion of the jar and the lower loop 1 the main portion of the jar.

Upon pressing the sections of the hand grasp one toward the other as may be done by the digits of the hand holding the same, the loops 1 and 8 are brought into effective clamping engagement with the jar whereby the same may be conveniently handled and especially when the jar is of excess heat, as for example as a result of the temperature of the contents of the jar. The device when applied also holds the jar to facilitate the application of the lid thereto or such other operations of the housewife incident to canning fruit and vegetables.

In the embodiment of my invention as illustrated in Figure 4, the extremities of the upper loop 8' are continued by the short arms 7' which terminate in the outwardly curved arms 14.

Welded or otherwise fixedly attached to the curved arms 14 at the opposite end portions thereof and at points intermediate such ends are the end portions of the bars 15. These bars are of desired length and have their lower extremities welded or otherwise fixedly attached to the curved arms 4' continuing from the outer extremities of the short arms 2'. The outer ends of these short arms 2' have welded or otherwise securely attached thereto the extremities of a flexible bottom loop 1'. By having this loop 1' flexible the device can be employed with equal facility with jars of differing cross sectional configuration as the flexibility of the bottom loop 1' will permit the same to readily conform to a configuration angular in cross section, as square, as well as a round cross section. The loop 1' is herein disclosed as reduced woven wire although as illustrated in Figure 6 a flexible loop 1ª may be used in the form of a coil spring. The upper loop 8' as well as the bottom loop 1' or 1ª are each encased within a sleeve 5' preferably of a rubber compound of the character hereinbefore particularly specified in connection with the sleeve 5.

From the foregoing description it is thought to be obvious that an automatic handy handle and holder for jars and the like constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A handle and holder for jars or the like comprising a lower split loop and an upper split loop, the extremities of both of the loops constituting outstanding arms, and a plurality of bars connecting the outer end portions of each arm of one loop with an arm of a second loop, each set of bars being arranged on substantially an outbow.

2. A handle and holder for jars or the like comprising a lower split loop and an upper split loop, the extremities of both of the loops being continued by outstanding arms, and a plurality of bars connecting the outer end portions of each arm of one loop with an arm of a second loop, each set of bars being arranged on substantially an outbow, the outer bar of the group being flat and of a material width to prevent the flat bar of one group passing the flat bar of the second group.

3. A handle and holder for jars or the like comprising a lower split loop and an upper split loop, the extremities of both of the loops constituting outstanding arms, and a plurality of bars connecting the outer end portions of each arm of one loop with an arm of a second loop.

4. A handle for jars or the like comprising a lower split loop and an upper split loop, the extremities of both of the loops constituting outstanding arms, and a plurality of bars connecting the outer end portions of each arm of one loop with an arm of a second loop, the outer bar of each set being of a width to prevent the outer bar of one set passing the outer bar of the second set.

CLYDE E. GOETTING.